July 26, 1955　　A. E. STRAUSSER, SR　　2,713,744
CHUM POT FOR SURF FISHING
Filed June 25, 1954　　2 Sheets-Sheet 1
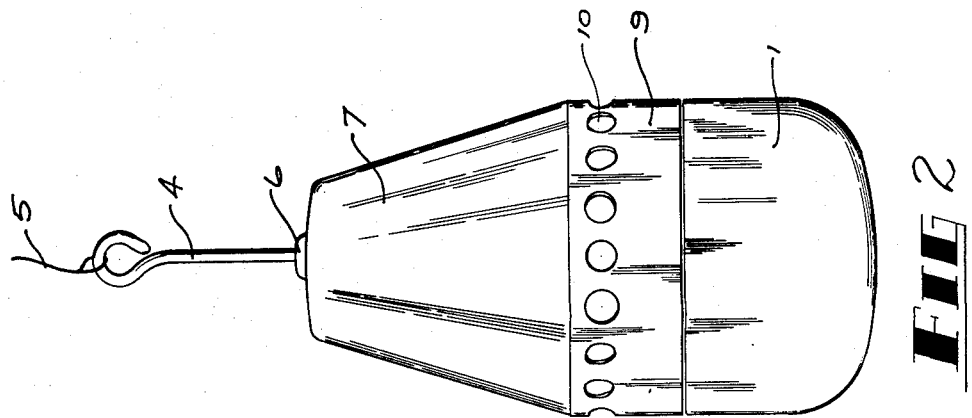
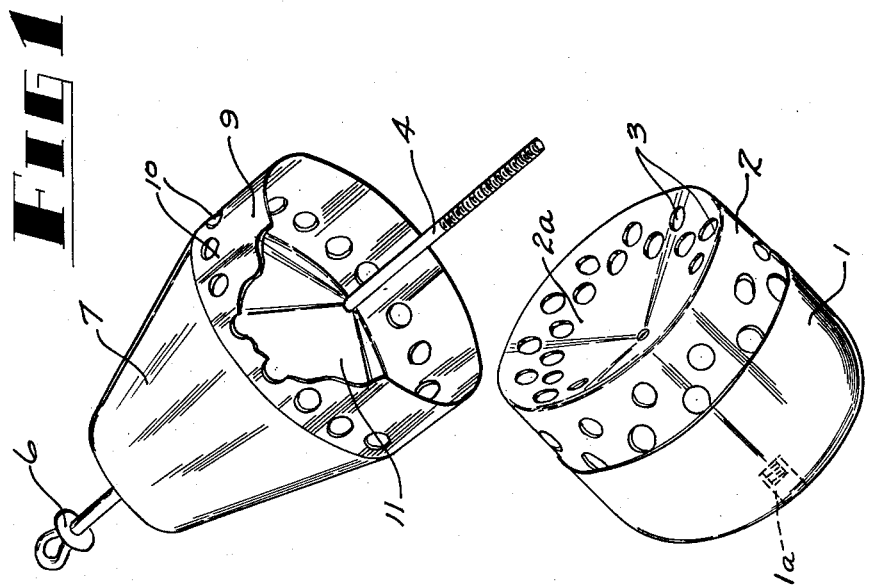
INVENTOR.
ARLAN E. STRAUSSER, SR.
BY
ATTORNEY July 26, 1955     A. E. STRAUSSER, SR     2,713,744
CHUM POT FOR SURF FISHING Filed June 25, 1954                                2 Sheets-Sheet 2

INVENTOR.
ARLAN E. STRAUSSER, SR.
BY
*William J. Ruano*
ATTORNEY

United States Patent Office 2,713,744
Patented July 26, 1955

2,713,744

CHUM POT FOR SURF FISHING

Arlan E. Strausser, Sr., Reading, Pa.

Application June 25, 1954, Serial No. 439,330

3 Claims. (Cl. 43—44.99)

My invention relates to a chum container or pot which is especially useful for surf fishing.

Pieces of oily fish, such as ground up mossbunker, mackerel, or herring, called chum, are used as fish bait particularly for blue, weak and tuna fish, and, more recently, for attracting bottom species to the hook by placing the chum in perforated cans or netted sacks and dropping them to the bottom of the water. In top fishing the chum is dribbled overboard in a steady stream to form a slick of oil and meat particles that may extend for a mile or more under good tide and wind conditions, so that fish crossing the slick alter their course and follow the trail.

An outstanding disadvantage of the above-mentioned methods of chumming is that they are cumbersome and are extremely wasteful of the chum. Moreover, they do not lend themselves to chumming at different heights of the stream or for surf fishing, therefore are ineffective for attracting a wide variety of fish.

An object of my invention is to provide a novel chum pot which is especially useful for surf fishing and which is devoid of the above-named disadvantages.

A more specific object of my invention is to provide a chum pot which automatically opens when dropped in the water to expose the chum, and which is adapted for use as a sinker or for attracting fish in a given area for surf fishing as well as for other types of fishing, such as with a line from a boat.

Other objects and advantages of my invention will become apparent from a study of the following description taken with the accompanying drawing wherein:

Figure 1 is a disassembled perspective view of a chum pot and float;

Figure 2 is a side elevational view of the parts shown in Figure 1 when in assembled and closed position ready for use;

Figure 3:
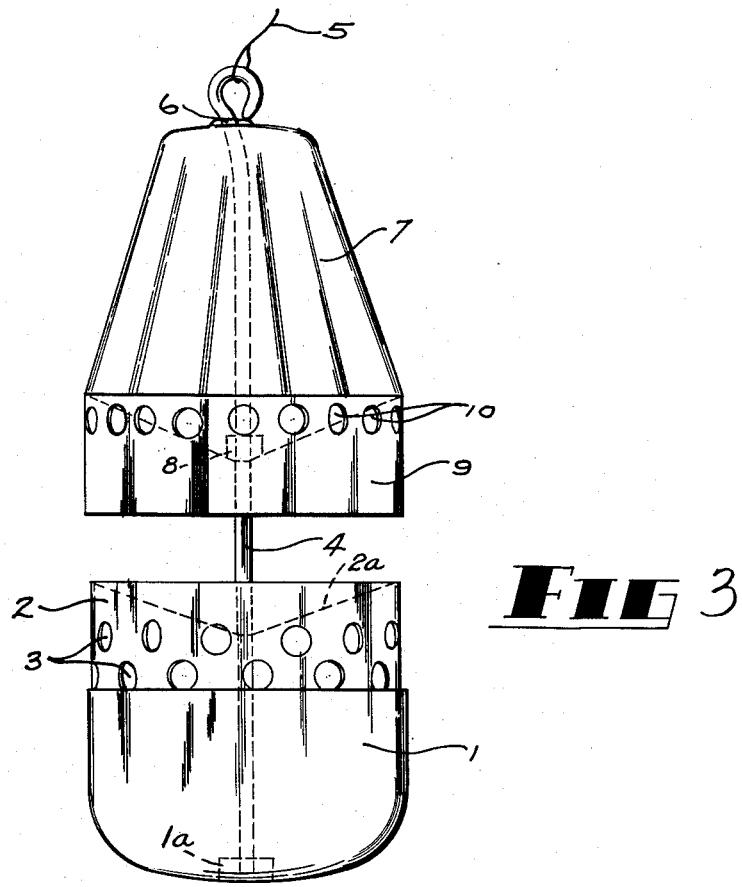
Figure 3 is a side elevational view similar to Figure 2 except showing the float in the raised position such as it assumes when the unit is lowered into the water.
Figure 4:
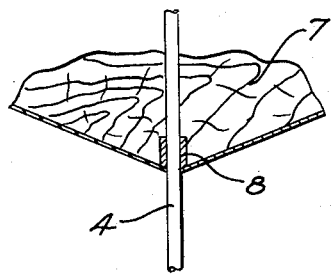
Figure 4 is a fragmentary, cross-sectional view of the central portion of the float.

Referring more particularly to Figure 1, numeral 1 denotes a cup-shaped container, preferably of metal such as brass, having a thickened and somewhat weighted bottom. The container is adapted to be filled with ground up fish or meat, that is, chum, or perhaps chum in prepared form in the form of compact cakes of ground up oily fish such as mossbunker, mackerel, herring or the like. A cover 2 having perforations 3 is provided to allow the oily slick from the chum to exude so as to attract fish. The top wall of cover 2 is dished in the shape of a shallow cone 2a, as shown. The side wall of cover 2 fits snugly inside the walls of container 1 to form a tight slip-fit. After chum is introduced in the container 1 and the cover 2 placed thereon, as shown in Figure 1, a stem 4 is introduced through a central hole in the cover, and the lower threaded portion of the stem is screwed into a threaded opening in a central boss 1a extending upwardly from the bottom portion of the container and shown in dotted lines in Figs. 1 and 3. A handline 5 or other line is attached to the eye portion at the top of the stem. A small washer 6 surrounds the stem and forms a stop for limiting upward movement of a float 7. The float 7 may be a solid piece of balsa wood or other light wood of the shape shown, or it may be merely a hollow metal container of copper or similar metal, similar to toilet tank floats, and having a light central tube therethrough through which stem 4 may extend. It is desirable to weight the lower portion of the float, such as by means of a sleeve 8. A dependent skirt 9, preferably of copper or other non-corrosive metal, extends from the sides of the float and has a plurality of perforations 10 for allowing the passing of the oily slick of the chum therethrough, and a metal bottom conical portion 11 is provided for the float 7 to serve as a reflector and shield.

In operation, after the container 1 is filled with chum and covered by cover 2, as shown in Figure 1, the lower portion of stem 4 is screwed to the container and the float 7 will drop by gravity into the closed portion as shown in Figure 2. In this position the perforations 10 in the skirt 9 are closed by the cover 2 so that the chum is completely enclosed and concealed and cannot escape through any portion of the unit. Thus the unit may be hurled from the end of the line out into the sea in the case of surf fishing. During the time it is in the air the chum pot will remain closed as shown in Figure 2.

However, the moment the chum pot enters the water, the float 7 will be raised relative to the container 1 into the position shown in Figure 3, its upper movement being limited by washer 6 which abuts against the eye portion of the stem 4. The oily slick then exudes from the chum and through perforations 3 so as to penetrate the side and top walls of cover 2 and some of the oily slick will flow underneath float 7 and outwardly therefrom through perforations 10. It will be noted that the conical shape of the metal bottom 11 will deflect the oily slick in the right direction to flow outwardly through perforations 10. The extent of automatic lifting of float 7 may be controlled either by the extent of screwing of the stem to the container, or by inserting one or more sleeves adjacent the washer 6 so as to lower the stop surface.

The chum pot described above may be used either by being thrown or cast to attract fish to a given fishing area, or by lowering the pot to the bottom or at any intermediate point from the surface to the bottom for fishing from a boat. Alternately, the chum pot may be used as a sinker for either type of fishing, that is, as a substitute for a sinker, in which case it will have the dual function of a sinker and a chum. The above-described chum pot is especially suitable for surf fishing since after it is hurled out into the surf, the agitation caused by the tide will help exude the oily slick so as to cover a substantial area and thus provide a lure which will attract many fish to the fish hooks secured to the end of the hand line 15 or to a line connected to a fishing rod.

Thus it will be seen that I have provided an efficient chum unit or container which is particularly useful for surf fishing although it is equally useful in a boat for lowering from a handline to different heights from the bottom of the water, or to the very bottom, and thus is adapted for attracting a wide variety of fish; furthermore I have provided a unit embodying a float which is automatically operable upon immersion in the water to open and expose the chum through perforations of the unit when in the water; furthermore I have provided a chum unit which will remain completely closed when in the air and while being hurled into the water for surf fishing, thus preventing the loss of chum at that time.

While I have illustrated and described an embodiment of my invention, it will be understood that this is by way

I claim:

1. The combination of a chum container for surf fishing, comprising a cup-like container, a removable perforated lid therefor, a float having a depending skirt portion slidably fitting said perforated lid and adapted to close said perforations as the result of lowering of said float, and a stem removably fitted in said container and passing through said container, said lid and through said float, said float being adapted to move relative to the container as the result of immersion in water to expose said chum to the water through said perforations of said lid.

2. The combination as recited in claim 1, wherein the stem extends through registering holes formed in said float, lid, and container, and said stem has threads adapted to be screw threadedly connected to said container, and has, at the upper end, an eye for attachment to a fishing line.

3. The combination as recited in claim 1 wherein the bottom wall portion of said float and the top wall portion of said cover are both correspondingly conical and adapted to be nested and fitted together, the conical portion of said cover being perforated.

References Cited in the file of this patent
UNITED STATES PATENTS

| | | |
|---|---|---|
| 758,434 | Forster | Apr. 26, 1904 |
| 1,807,712 | Spofford | June 2, 1931 |
| 2,479,399 | Patten | Aug. 16, 1949 |
| 2,612,718 | Steinberg | Oct. 7, 1952 |
| 2,614,358 | Adams | Oct. 21, 1952 |
| 2,634,540 | Nelson et al. | Apr. 14, 1953 |